Patented May 25, 1943

2,320,087

UNITED STATES PATENT OFFICE 2,320,087

CHEMICAL COMPOSITION

William M. Lee, Kew Gardens, and Carl R. Erikson, New York, N. Y., assignors to The Arabol Manufacturing Company, New York, N. Y., a corporation of New York No Drawing. Application January 15, 1941, Serial No. 374,472

12 Claims. (Cl. 106—124)

This invention relates to novel compositions particularly useful as adhesives, bindings, coating compositions or for plastics. In accordance with the present invention, normally stable aqueous solutions are provided which become water-insoluble solids upon evaporation of their volatile ingredients.

The compositions of the invention remain in a liquid or aqueous peptization state when protected against evaporation of contained volatile ingredients, remaining stable and not becoming water-insoluble. When applied to surfaces and exposed to the atmosphere, or otherwise permitted to lose their volatile components, the compositions become effective for the aforesaid uses. There are many industrial applications for which the compositions of the invention are particularly suited, such as a waterproof adhesive useful in the manufacture of paper bags, as a vehicle for wallpaper printing, as a wall sizing composition, as a general binding agent for molded plastic articles, in water paints, etc. No commercial wastage of the composition occurs in view of its stability that is readily controlled in practice.

Essentially the present invention involves the provision of compositions which are normally in a liquid or viscous state containing protein and substances which promote the development of an acid reaction during the loss of volatile ingredients and a substance which evolves free aldehyde after the development of an acid reaction. The constituents of the composition remain stable until evaporation of the volatile components results in the development of an acid reaction which in turn causes the formation of free aldehyde, which in turn reacts with the proteins present to form a substantially water-insoluble compound. The rate of insolubilization of the protein is controllable by a selection of the ingredients as well as by the rate of evaporation imparted on the composition. While it has heretofore been known that an aldehyde will insolubilize a protein, such actions were induced by a direct mixing wherein the resultant composition had a relatively short life in solution. Commercial application of this principle was impractical or exceedingly difficult for the type of application to which the present invention is directed. The compositions of the invention are in permanent liquid form applicable for industrial services to produce an insolubilized protein solid layer in a precisely controllable manner. The aldehyde forming component is completely stable in the composition until evaporation produces an acid reaction and thereby induces the insolubilization.

The compositions of the invention are in the form of a permanently alkaline liquid composition which become acidic upon evaporation of volatile ingredients. The aldehyde derivative is completely stable in the composition while alkaline. When the composition becomes acidic due to the evaporation, the aldehyde derivative thereupon insolubilizes the protein component. As will be shown hereinafter, by carefully selecting the aldehyde derivative, a high degree of protein insolubility can take place at a relatively rapid rate when the composition turns acidic.

The compositions comprise a suitable protein which is dissolved or dispersed in water with the aid of a solubilizing agent; a salt composed of a non-volatile acid with a volatile base; and a substance stable in basic solution that yields an aldehyde when the composition turns acidic. The compositions contain a volatile base in sufficient quantity to make the pH value of the entire composition preferably between 7.5 and 8.5. Upon evaporation of the volatile base, the composition turns acidic in nature causing a decomposition forming an aldehyde which in turn insolubilizes the protein. Other ingredients may be present in the compositions to, for example, increase the plasticity of the insolubilized protein, give it a suitable color, protect it from bacterial attack, or for other reasons or effects.

The protein used is preferably one that has a sufficiently acid characteristic to give water-soluble salts when acted upon by a base. Casein, soya bean protein, animal glue, albumen and other proteins have been found commercially suitable, the preferred proteins being casein and soya bean. A preferable solubilizing agent is a volatile base. Its solubilizing of the protein may be said to produce a water-soluble proteinate in the nature of a salt. Other good solubilizing agents are relatively neutral salts such as sodium thiocyanate or sodium acetate having a gel liquefying action. Also, a mixture of a volatile base with such gel liquefying salt may be employed. There is present in addition to the protein and insolubilizing agent or agents a salt of a volatile base with a non-volatile acid and there is also present a slight excess of free volatile base. The salt of volatile base with non-volatile acid must be present in sufficient quantity to effect the change from alkalinity to acidity as hereafter described and the excess volatile base must be present in sufficient quantity to give the initial composition the alkaline reaction desired. We will hereinafter use the expression "aldehydogenic" when referring to the compound which is stable in basic solution or suspension and unstable in acid solution or suspension, and decomposes fairly rapidly under the acid condition to yield an aldehyde.

The compositions of the invention remain stable indefinitely, particularly with regard to aldehyde in solubilization of the protein as long as they are stored under suitable conditions protecting them from loss of volatile ingredients. Upon exposing the compositions to conditions permitting the substantial loss of their volatile ingredients, the following changes take place:

1. The water is lost by evaporation.
2. The excess volatile base is lost by evaporation.
3. (a) If the acid constituent of the salt is from the class of weak acids, the volatile base constituent of this salt will be in considerable part lost by evaporation since by dissociation such salts yield a relatively great proportion of free base and free undissociated acid and only a relatively small proportion of basic ion and acidic ion.
    (b) If the acid constituent of the salt is from the class of strong acids, little or no volatile base will be lost and the salt will remain substantially as such in the dried composition.
4. A considerable portion of whatever volatile base is in combination with the protein is lost by evaporation, since proteinates dissociate in a manner similar to the salts discussed under 3 (a).
5. As the composition dries, it decreases in alkalinity due to loss of the volatile base, and conversely increases in acidity due to the acidic remainder comprising:
    (a) protein plus residual weak non-volatile acid, or
    (b) protein plus residual salt of a weak base with a strong acid, which salt will have a pH value substantially less than 7.
6. The aldehydogenic compound being unstable in acid solution or suspension, breaks down to yield a free aldehyde together with one or more other substances.
7. The free aldehyde reacts with the protein to produce a substantially water-insoluble compound.

Preferred bases for the compositions are those relatively highly volatile, such as ammonia, volatile amines such as ethylamine and dimethylamine, or equivalent compounds. However, less volatile bases are usable, as for example butylamine, and amines containing other substituents such as morpholine. In order to obtain the greatest change from alkalinity to acidity during the drying period, we prefer to use a salt composed of a non-volatile weak acid with a volatile weak base. Commercial examples of such salts are ammonium lactate and ethylamine glycollate. Salts of weak bases with strong acids of the class which in solution show a pH value substantially less than 7 may also be used, ammonium sulphate being an example. It is to be understood that the salt may be added to the composition when formed, as such, or produced by reaction of the corresponding acid and base therein.

Suitably commercial aldehydogenic compounds include the group of chemical substances which are the ether derivatives of hypothetical glycols derived from the aldehydes. We have found to be suitable the open chain di-ether derivatives of these hypothetical glycols generically referred to as acetals; the mono-ether derivatives generically referred to as hemi-acetals; the cyclic acetals having five membered rings generically referred to as dioxolanes; and the cyclic acetals having six membered rings generically referred to as dioxanes. Also we have found the acetals of a considerable variety of aldehydes to be satisfactory, including acetals derived from formaldehyde, acetaldehyde, benzaldehyde and glyoxal.

The acetals or hemi-acetals do not all serve equally well in practice, since in some cases the released aldehyde reacts so slowly with the protein that the development of insolubility is extended over a range which is not commercially practical. In other cases the acetal does not hydrolyze to yield free aldehyde at a sufficiently rapid rate to be commercially practical under the conditions of the reaction.

We prefer, therefore, to select an acetal derived from an aldehyde compound in which the aldehydic function is the chief function, as in formaldehyde or acetaldehyde; and further to select one which has a fairly rapid hydrolysis rate under moderately acid conditions. For instance, diethyl acetal (1,1-diethoxy ethane) is an aldehydogenic substance which in aqueous solution at a pH of 4.5 and at a temperature of 25° C. will be approximately 50% hydrolyzed at the end of five hours. In a suitably formulated composition of the type just disclosed, the pH value will be approximately 4.5 after substantially complete loss of the volatile base. This pH value should preferably be reached while substantial quantity of both aldehydogenic substance and water are still present in the composition, so that a fairly rapid hydrolysis will occur.

Also, it is better not to use a too volatile aldehydogenic substance, preferably one not more volatile than diethyl acetal and/or substantially less so. Furthermore, we also prefer an aldehydogenic substance which will not form an exceptionally low boiling azeotropic mixture with water. Our preferred compositions will furthermore use an aldehydogenic substance which is somewhat water-soluble but we do not wish to restrict ourselves to water-soluble substances of this class inasmuch as water-insoluble aldehydogenic substances may be emulsified into our compositions and under such circumstances will perform suitably.

A large number of aldehydogenic substances were examined for the purpose of the present invention, including the following compounds:

A. Diethyl formal.
B. Diamyl formal.
C. Di (2-methoxyethyl) formal.
D. Triethylene glycol formal.
E. Diethyl acetal.
F. Di-(2-methoxy ethyl) acetal.
G. 1,3-dioxolane.
H. 2 methyl 1,3-dioxolane.
I. 4-hydroxy methyl 1,3-dioxolane.
J. 2-phenyl 4-hydroxy methyl 1,3-dioxolane.
K. 4 methyl 6,6-dimethyl 1,3 dioxane.
L. Glyoxal-tetra butyl acetal.
M. Glyoxal - tetra (2 - methoxy ethyl) acetal.
N. Naphthodioxane.

We have found that the configuration

has generally a relatively less desirable slow decomposition rate in acid medium, whether in a ring or in an open chain. Also we have found that the configuration

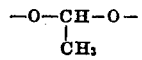

has in general a desirable decomposition rate in acid medium, whether in a ring or a straight chain. Further, we have found that the configuration

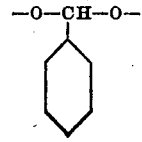

has a desirable decomposition rate in acid medium when it exists in a five or six membered ring, but has too rapid a decomposition rate in acid medium when it exists in a straight chain.

Some of the above aldehydogenic substances, arranged in order of decreasing decomposition rate under uniform pH, concentration, and temperature conditions are as follows: J, E, H, M, C, I, A, G. Of these, J, E and H have highly satisfactory decomposition rates at pH values of four to five, and compounds with decomposition rates of this order are preferred. Compound A is more volatile than is desirable and for this reason would not be included in our preferred group, as well as because of its slow decomposition rates. Compounds B, D, L and N have very limited solubility in water and would therefore not be included in our preferred group, as well as because of their slow decomposition rates.

However, in case a substantially water-insoluble aldehydogenic substance is used, we may also use an intermediate solvent in our composition to establish a partial solubility of the aldehydogenic substance. A water-soluble alcohol or ketone would be a suitable intermediate solvent, or we may take steps to emulsify or disperse the aldehydogenic substance in the aqueous composition. Other substituents may be present in the aldehydogenic substance providing these are not such as will interfere with any of the desired reactions or if they are not such as will produce undesirable properties in the dried composition.

The above are to be considered as representative of the variety of classes and substances which may be used, since we do not wish to be limited to any particular species. It is obvious that it is impractical to give examples of compositions demonstrating all of the possible members of the classes involved. Three preferred examples are herein presented, as illustrative of the invention compositions:

*Example I*

| | Pounds |
|---|---|
| Casein | 40 |
| Water | 150 |
| 85% lactic acid | 10.8 |
| 28% ammonium hydroxide | 9.2 |
| Diethyl acetal | 7 |
| Chloro cresol | 0.25 |
| Total | 217.25 |

*Example II*

| | Pounds |
|---|---|
| Casein | 50 |
| Water | 150 |
| Glycollic acid | 9.2 |
| 33% ethylamine | 18 |
| 2-phenyl-4-hydroxy methyl 1,3-dioxolane | 7 |
| Chloro cresol | 0.25 |
| Total | 224.45 |

*Example III*

| | Pounds |
|---|---|
| Soya bean protein | 50 |
| Water | 215 |
| Sodium thiocyanate | 25 |
| 85% lactic acid | 10.8 |
| 28% ammonium hydroxide | 9.2 |
| Diethyl acetal | 7 |
| Chloro cresol | 0.25 |
| Total | 317.26 |

These compositions are viscous liquids which remains commercially useful for an indefinite period, and which are suitable, without further modification, as adhesives, coating compositions, binder compositions, or in general as solutions to be regenerated into plastic compositions.

The method of manufacture of these compositions will be understood by those versed in the art and need not therefore be discussed fully. Certain precautions may however be mentioned. It is desirable to soak the casein or other protein in a portion of the water for a short period to promote swelling before addition of the volatile base or gel liquefying salt. Heat may be used, if desired, to facilitate complete solution of the protein after the addition of the solubilizing agent, providing the temperature is not carried so high as to volatilize an important amount of the volatile base which may already be present, or providing whatever volatile base is lost be replaced after the heating operation is completed. It is important not to use all of the volatile base in accomplishing the solution of the protein, but to withhold a sufficient quantity to completely neutralize the non-volatile acid. The acid and volatile base are preferably mixed before being added to the protein solution. The preservative (chloro cresol), and aldehydogenic substance are added last, preferably after the solution is cooled to room temperature.

In the examples given, there is considerable excess of aldehydogenic substance over that theoretically required. The proportions of the volatile base and non-volatile acid are, on the other hand, rather carefully balanced. For instance, in Example I the ammonium hydroxide present is sufficient to dissolve the casein and to react with all of the lactic acid to form ammonium lactate, and in addition there is sufficient excess of ammonium hydroxide present to give to the final composition a pH value of 8.5. It is not advisable to use the ammonia or other volatile base in such quantity that the pH value of the composition is increased substantially above 8.5 since the aldehydogenic substances are entirely stable at this pH value and additional alkalinity unnecessarily lengthens the time required for the composition to drop to a pH value of 4.5 for the insolubilization action. It is to be noted that a film of the composition of Example I, of 0.001 inch thickness spread upon glass or other impermeable surface, loses its excess of volatile base and acquires an acid character within two to five minutes at normal room temperature. Increasing the initial pH value of this composition would correspondingly lengthen the time required for it to reach an acid reaction.

It is to be further noted that by the selection of a suitable acid and its use in suitable quantities, the final pH value of the dried composition may be adjusted to very closely approximate the isoelectric point of the protein used. For instance, the final pH value of 4.5 which is reached by the composition of Example I is very close to the isoelectric point of casein. This is advantageous inasmuch as the reaction product of proteins with aldehydes shows much reduced water absorbent properties in the pH range close to the isoelectric point of the protein.

The method of utilization of the invention compositions naturally depends upon their intended purpose. When, for instance, the composition is to be spread in a thin film for laminating sheets of paper, or for protectively coating a single sheet of paper, it is desirable to dry the film only to the point where it ceases to be tacky and to then rewind the paper web, stack the paper sheets, or by other means somewhat retard the rate of drying from that point on. This procedure allows a period of several hours for the decomposition of the aldehydogenic substance and the insolubilization of the protein, before the moisture is lost. The reactions cease entirely when all water is removed from the film by volatilization, or when all of the aldehydogenic substance or its resultant aldehyde is removed by volatilization or reaction.

The rate of change from alkalinity to acidity, the rate of hydrolysis of the aldehydogenic substance, and the rate of insolubilization of the protein by the released aldehyde, are all accelerated by an increase in temperature. This increase in temperature, however, must be limited by the volatility of aldehydogenic substance and by the volatility of the aldehyde from which it is derived. The temperature should not be increased to a point which would drive off the aldehydogenic substance or the aldehyde before the desired reaction on the protein has taken place. For most applications we consider a temperature of 40° to 50° C. more desirable than room temperature. However, if it is required to increase the temperature materially above this, the compositions may be proportioned to meet such requirement, particularly by the selection of a suitable aldehydogenic substance. For instance, 2-phenyl 4-hydroxymethyl 1,3-dioxolane is more suitable for drying at higher temperatures than is diethyl acetal.

It is to be understood that various modifications and other equivalent compounds may be incorporated in the compositions of the invention without departing from the broader spirit and scope of the invention. Accordingly, we do not intend to be limited except as set forth in the appended claims.

What is claimed is:

1. A liquid composition comprising an alkali soluble protein, a volatile base for normally retaining said protein in dissolved condition, an acetal adapted to decompose to form aldehyde under acid conditions, a substantially non-volatile acid substance for decomposing said acetal, the quantity of base being sufficient to neutralize said acid substance and maintain said liquid composition alkaline, whereby upon volatilization of said base the composition becomes acid and generates aldehyde which insolubilizes said protein.

2. A liquid composition comprising an alkali soluble protein, a volatile base for normally retaining said composition alkaline, a salt of a non-volatile weak acid and a volatile base adapted for providing acid conditions upon volatilization of said base, and an acetal adapted to decompose to form aldehyde under acid conditions, whereby upon volatilization of said base said composition becomes acid and generates aldehyde which insolubilizes said protein.

3. A liquid composition comprising an alkali soluble protein, a volatile base and a salt adapted to provide a gel liquefying action for normally retaining said protein in substantially liquid condition, an acetal adapted to decompose to form aldehyde under acid conditions, a substantially non-volatile acid substance for decomposing said acetal, the quantity of base being sufficient to neutralize said acid and maintain said liquid composition alkaline, whereby upon volatilization of said base said composition becomes acid and generates aldehyde which insolubilizes said protein.

4. A liquid composition comprising an alkali soluble protein dispersed in solution, a volatile base for normally retaining said composition alkaline and said protein in dispersion, an acetal adapted to decompose to form aldehyde under acid conditions, a substantially non-volatile acid substance for decomposing said acetal, the quantity of base being sufficient to neutralize said acid substance and maintain said liquid composition alkaline, whereby upon volatilization of said base the composition becomes acid and generates aldehyde which insolubilizes said protein.

5. The composition as in claim 1 wherein said acetal is a dioxolane.

6. The composition as in claim 1 wherein the protein is casein and the acetal is 2-phenyl 4-hydroxy methyl 1, 3-dioxolane.

7. The composition as in claim 1 wherein the acetal is a dioxane.

8. The composition as in claim 1 wherein the acetal is diethyl acetal.

9. An alkaline liquid composition comprising casein, a volatile base in quantity sufficient to maintain the pH of said composition between approximately 7.5 and 8.5, a salt of a non-volatile weak acid with a volatile base adapted to provide acid upon volatilization of said base, and an acetal adapted to decompose to form aldehyde under acid conditions, whereby upon volatilization of said base said composition becomes acid and generates aldehyde which insolubilizes said protein.

10. The composition as in claim 9 wherein the volatile base is ammonia and the salt is ammonium glycollate.

11. The composition as in claim 9 wherein the volatile base is ammonia and the salt is ammonium lactate.

12. The composition as in claim 9 wherein the volatile base is an ethylamine.

WILLIAM M. LEE.
CARL R. ERIKSON.